(12) United States Patent  (10) Patent No.: US 9,006,929 B2
Nam  (45) Date of Patent: Apr. 14, 2015

(54) POWER SUPPLY DEVICE

(75) Inventor: Won Seok Nam, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 813 days.

(21) Appl. No.: 13/245,031

(22) Filed: Sep. 26, 2011

(65) Prior Publication Data

US 2012/0161522 A1 Jun. 28, 2012

(30) Foreign Application Priority Data

Dec. 27, 2010 (KR) .......................... 10-2010-0136066

(51) Int. Cl.
H02J 9/00 (2006.01)

(52) U.S. Cl.
CPC ..................... *H02J 9/005* (2013.01)

(58) Field of Classification Search
CPC ....................................................... H02J 9/005
USPC ............................................................ 307/64
See application file for complete search history.

(56) References Cited

U.S. PATENT DOCUMENTS 5,410,441 A * 4/1995 Allman ........................... 361/18
5,949,660 A * 9/1999 Rehm et al. ................. 363/21.07
6,003,139 A * 12/1999 McKenzie ..................... 713/300
6,489,725 B1 * 12/2002 Suzuki et al. ................. 315/159
2005/0248968 A1 * 11/2005 Chang ........................... 363/125
2009/0185402 A1 * 7/2009 Lam et al. ..................... 363/126
2009/0287946 A1 * 11/2009 Lin ............................... 713/323
2010/0202161 A1 * 8/2010 Sims et al. ..................... 363/20

FOREIGN PATENT DOCUMENTS

| JP | 2000-514999 A | 11/2000 |
| KR | 20-1997-0003440 U | 1/1997 |
| KR | 10-2009-0015664 A | 2/2009 |
| KR | 10-2010-0053799 A | 5/2010 |

OTHER PUBLICATIONS

KIPO Search Report for Korean Patent Application No. 10-2010-0136066 which corresponds to the above-identified application.
KIPO Notice of Allowance for Korean Patent Application No. 10-2010-0136066 which corresponds to the above-identified application.

* cited by examiner

*Primary Examiner* — Jared Fureman
*Assistant Examiner* — Joel Barnett
(74) *Attorney, Agent, or Firm* — LRK Patent Law Firm

(57) ABSTRACT

A power supply device is provided. The power supply device includes: an AC power output unit storing and outputting an AC power; a rectifier unit rectifying an output of the AC power output unit; a DC output unit outputting an output from the rectifier unit as a DC power; and a standby power reduction unit detecting a signal regarding whether the AC power is inputted or not and discharging a standby power stored in the AC power output unit in response to the detected signal.

12 Claims, 7 Drawing Sheets

POWER SUPPLY DEVICE

CROSS-REFERENCE TO RELATED APPLICATIONS

The present application claims priority under 35 U.S.C. 119 to Korean Patent Application No. 10-2010-0136066, filed on Dec. 27, 2010, which is hereby incorporated by reference in its entirety.

BACKGROUND

The present disclosure relates to a power supply device.

In general, in order to use an electrical appliance such as a copying machine, a video recorder, a microwave oven, a dish washer, a cell phone charger, a computer, a monitor, a printer, a facsimile, and a washing machine in a home or an office, commercial power is supplied via connecting a plug, wired to the electrical appliance, to a wall outlet installed at the wall of a building or a multi tap extending from the wall outlet.

Moreover, while the electrical appliance is installed, the plug of an electrical appliance connected to a wall outlet installed at the wall of a building or a multi tap typically maintains a constant state of being connected to each other, so that commercial power is continuously supplied regardless of its use. When commercial power is constantly supplied through the plug of an electrical appliance connected to a wall outlet, the time required for standing by a certain function in a power off state takes a larger part of a total usage time than the time required for performing an original function of the electrical appliance. Therefore, the consumption of power vampire, which plays an important role in determining an energy efficiency rating of an electrical appliance, is excessively high.

In order to completely prevent the consumption of power vampire in an electrical appliance, a user may directly separate the plug of an electrical appliance from a wall outlet or a multi tap or may turn off a power switch in each power outlet of a multi tap. As a result, a commercial power (i.e., a main power) supplied to the electrical appliance is completely cut off. However, this is very cumbersome. Due to this reason, the complete standby power off is not widely used.

Additionally, as a commercial power (i.e., a main power) is constantly supplied to an electrical appliance through a plug connected to a wall outlet, components of the electrical appliance become deteriorated thereby reducing its lifecycle. Also, when an over current occurs due to a bolt of lightning, it occasionally flows into the electrical appliance along its power line to damage the electrical appliance.

Furthermore, various devices, which cut off Power Vampire when it is determined by recognizing power consumption that power is off, have been developed and mounted on an electrical appliance. However, in such a case, the electrical appliance is not turned on when a remote controller is used for a certain operation. Thus, a user may personally turn on a power switch mounted on the electrical appliance and this causes inconvenience.

Moreover, if a commercial power (i.e., a main power) supplied to an electrical appliance is cut off, its timer mode becomes useless.

SUMMARY

Embodiments provide a power supply device having a power vampire reduction circuit.

Embodiments also provide a power supply device having improved reliability by detecting an input state of power and reducing standby power automatically.

In one embodiment, a power supply device includes: an AC power output unit storing and outputting an AC power; a rectifier unit rectifying an output of the AC power output unit; a DC output unit outputting an output from the rectifier unit as a DC power; and a standby power reduction unit detecting a signal regarding whether the AC power is inputted or not and discharging a standby power stored in the AC power output unit in response to the detected signal.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

Figure 1:
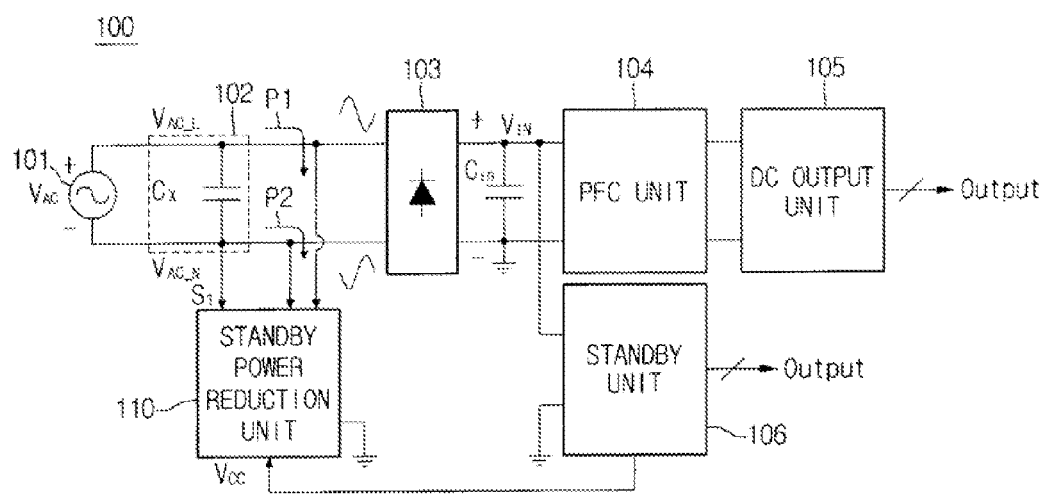
FIG. 1 is a circuit diagram illustrating a power supply device according to a first embodiment.

FIG. 1 is a circuit diagram illustrating a power supply device according to a first embodiment.

Referring to FIG. 1, the power supply device 100 includes a power unit 101, an AC power output unit 102, a rectifier unit 103, a Power Factor Correction (PFC) unit 104, a DC power output unit 105, a standby unit 106, and a standby power reduction unit 110.

The AC power output unit 102 stores and outputs an AC power inputted from the power unit 101. The AC power includes commercial power. The AC power input unit 102 includes a capacitor Cx, for example. The capacitor Cx is connected in parallel to the both terminals of the power unit 101 and charges and discharges an AC power. As another example, the AC power output unit 102 may include a filter but is not limited thereto.

The rectifier unit 103 rectifies and outputs an AC power outputted from the AC power output unit 102. The rectifier unit 103 may include a bridge diode and wave-rectifies and outputs an AC power.

An input capacitor Cin is connected to the both output terminals of the rectifier unit 103 and removes a ripple of a DC power outputted from the rectifier unit 103 and outputs the DC power to the PFC unit 104. The PFC unit 104 may include a line filter and a capacitor device but is not limited thereto.

The PFC unit 104 improves a power factor of the voltage rectified by the rectifier unit 103, converts the rectified voltage into a DC voltage, and outputs the DC voltage. The DC output unit 105 converts an output voltage of the PFC unit 104 into a DC voltage necessary for a load and outputs the DC voltage. The DC output unit 105 may include a DC converter or a transformer.

The standby unit 106 receives an input power of the PFC unit 104, outputs the input power as a standby power, and controls an operation status of a system in response to an external control signal.

The standby power reduction unit 110 is connected to at least one of the both terminals of the power unit 101, detects whether an inputted power $V_{AC\_L}$ and $V_{AC\_N}$ is supplied, is turned off (i.e., a n operating mode) when it is detected that the AC power is more than a predetermined level (i.e., an operating voltage), and is turned on (i.e., a standby mode) when it is detected that the AC power is not more than the predetermined level (i.e., an operating voltage).

If an AC power of the standby power reduction unit 110 is not supplied, power is not supplied to the power unit 101. At this point, the standby power reduction unit 110 provides a discharge path for lowering a power (hereinafter, referred as a standby power) stored in the AC power output unit 102 to be lower than a predetermined voltage within a predetermined time.

The standby power reduction unit 110 is connected to the both terminals of the AC power output 102 and discharges a standby power of the AC power output 102 to a ground terminal.

The standby power reduction unit 110 operates by receiving a bias voltage from the standby unit 106 or the external and the bias voltage may be supplied while the standby power is reduced even if the power of the power unit 101 is off.

The standby power reduction unit 110 is turned on when the AC power is not supplied and provides a discharge path of the stored standby power, thereby reducing the standby power stored in the AC power output unit 102 for a predetermined time. Accordingly, the standby power stored in the AC power output unit 102 may be lowered than a predetermined voltage for a predetermined time, so that damages to a device or a user due to a high AC voltage may be prevented. The standby power reduction unit 110 may satisfy a safety standard that energy stored in the AC power output unit 102 should be lower than about 60 V within 2 seconds.

Figure 2:
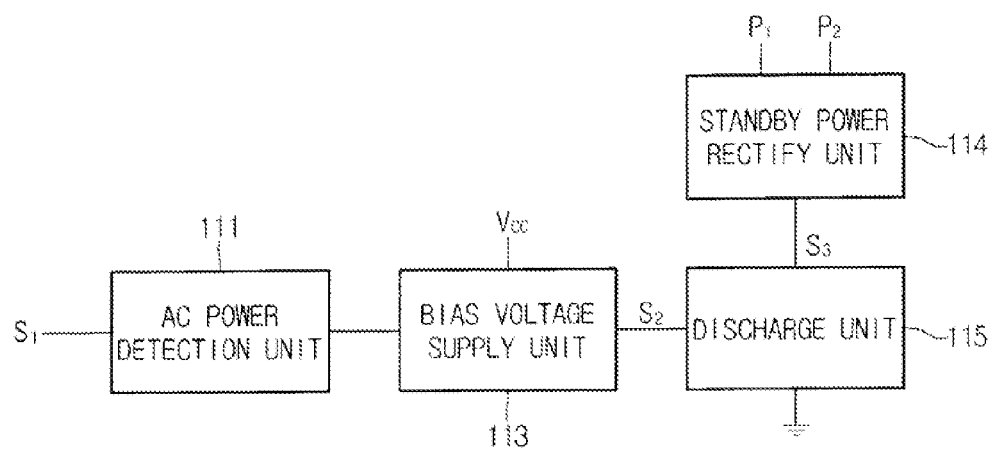
FIG. 2 is a view of the standby power reduction unit of FIG. 1.

Referring to FIG. 2, the standby power reduction unit 110 includes an AC power detection unit 111, a bias power supply unit 113, a standby power rectifier unit 114, and a discharge unit 115.

The AC power detection unit 111 is connected to a second line $V_{AC\_N}$ among the both terminals of the power unit 101 and detects a power S1 applied to the second line $V_{AC\_N}$ of the power unit 101. As another example, the AC power detection unit 111 may be connected to a first line $V_{AC\_L}$ but is not limited thereto. The first line $V_{AC\_L}$ may be a positive polarity terminal and the first line $V_{AC\_N}$ may be a negative polarity terminal.

The AC power detection unit 111 turns off an operation of the bias voltage supply unit 113 in a power mode and turns on an operation of the bias voltage supply unit 113 in a standby mode. That is, the AC power detection unit 111 controls an operating voltage of the bias voltage supply unit 113 according to whether power is supplied or not.

The bias voltage supply unit 113 controls an output of a bias voltage according to an operation status of the AC power detection unit 111 and outputs a bias voltage to the standby unit 106 in a standby mode.

The discharge unit 115 is turned on by a voltage of the standby unit 106 and the standby power rectifier unit 114 rectifies a standby power stored in the AC power output unit 102. The standby power rectifier unit 114 is connected to the both terminals of the AC power output unit 102 and rectifies and outputs the standby powers P1 and P2 applied to one of the both terminals of the AC power output unit 102.

The discharge unit 115 outputs the standby power S3 rectified by the standby power rectifier unit 114 to the ground terminal through conduction. Accordingly, the discharge unit 115 provides a discharge path of a standby power in a standby mode.

Figure 3:
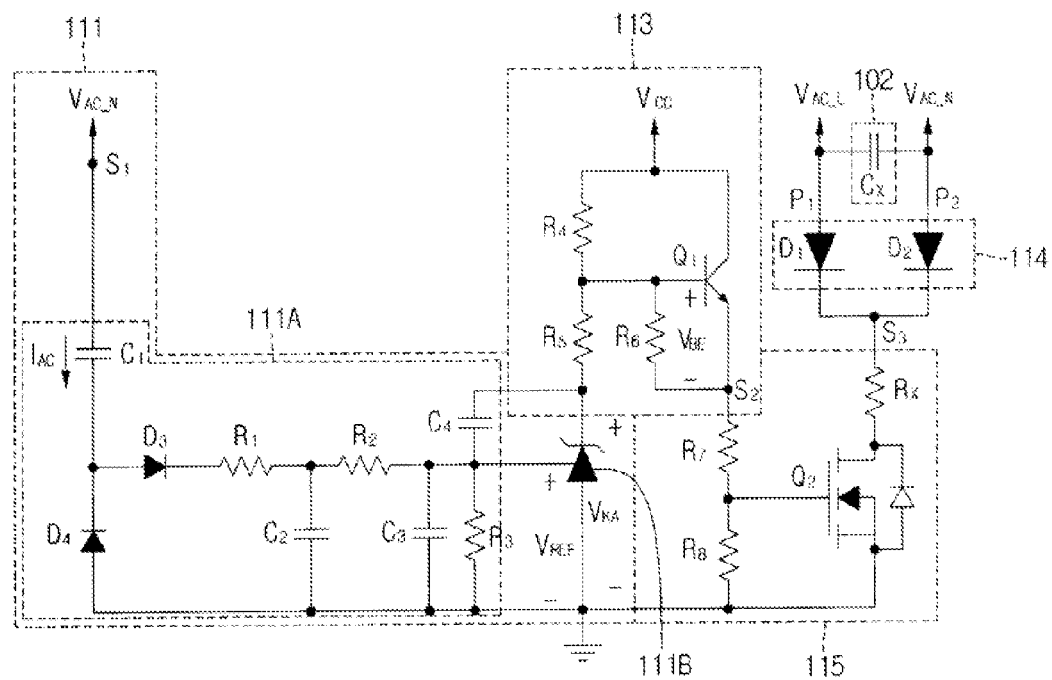
FIG. 3 is a circuit diagram of the standby power reduction unit of FIG. 1.

FIG. 3 is a circuit diagram of the standby power reduction unit of FIG. 1.

Referring to FIGS. 2 and 3, the AC power detection unit 111 is connected to a first line $V_{AC\_N}$ to which an AC power is applied and receives an AC power through the first line $V_{AC\_N}$. The first line $V_{AC\_N}$ may be a negative polarity terminal The AC power detection unit 111 includes an operating voltage detection circuit 111A and a comparison device 111B. The operating voltage detection circuit 111A detects a level of the AC power and then, outputs it as an operating voltage of the comparison device 111B. The comparison device 111B is conducted or outputs a reference voltage according to an operating voltage level of the operating voltage detection circuit 111A.

The operating voltage detection circuit 111A includes a first capacitor C1, a third diode D3, a fourth diode D4, first to third resistors R1, R2, and R3, second and third capacitors C2 and C3, and a fourth capacitor C4. Here, the first capacitor C1 and the third resistor R3 constitute a charge/discharge circuit. The third diode D3 is used for protection. The second and third capacitors C2 and C3 are a ripple removing circuit and are connected to the first and second resistors R1 and R2 to constitute a differential circuit or a low pass filter. The first and second resistors R1 and R2 constitute a voltage divider circuit and the fourth diode D4 is connected to a reverse current path.

The first capacitor C1 is connected to a second line $V_{AC\_N}$. An anode of the third diode D3 and a cathode of the fourth diode D4 are connected to the first capacitor. C1. An anode of the third diode D4 is connected to a ground terminal.

The first resistor R1 and the second resistor R2 are connected in series to the third diode D3. The second capacitor C2 is connected in parallel to between the first resistor R1 and the second resistor R2. The other terminal of the second capacitor C3 is grounded.

The third resistor R3 is connected in parallel to the second resistor R2. The third capacitor C3 is connected in parallel to between the third resistor R3 and the second resistor R2. The other terminal of the third capacitor C3 is grounded. A reference terminal Vref of the comparison device 111B is connected to a connection node between the second resistor R2 and the third resistor R3. In the comparison device 111B, a second terminal (−) is connected to the ground terminal and the first terminal (+) is connected to the bias voltage supply unit 113. The fourth capacitor C4 is connected to between the reference terminal and the first polarity terminal of the comparison device 111B.

The operating voltage detection circuit 111A charges an inputted current IAC on the first capacitor C1 and discharges the current $I_{AC}$ through the resistor RI, the second capacitor C2, the second resistor R2, and the third capacitor C3. The operating voltage detection circuit 111A detects an operating voltage of the comparison terminal 111B.

An operating voltage divided by the second resistor R2 and the third resistor R3 is applied to the reference terminal of the comparison device 111B. The comparison device 111B outputs a low output VKA to the second terminal (+) when the operating voltage higher than an internal reference voltage is applied and an output VKA of the second terminal (+) is raised when the operating voltage lower than the internal reference voltage is applied.

The comparison device 111B as an integrated device includes a shunt regulator or a comparator. The comparison device 111B compares an input operating voltage with an internal reference voltage. The comparison device 111B outputs a high signal if the input operating voltage is lower than the internal reference voltage and outputs a low signal if not. Here, the comparison device 111B outputs a low signal in a power mode and outputs a high signal in a standby mode.

If the comparison device 111B is a shunt regulator, the reference terminal is connected to the resistors R2 and R3, an anode terminal is connected to the ground terminal, and a cathode terminal is connected to the bias power supply unit 113.

The bias voltage supply unit 113 includes a first switching device Q1. A bias voltage VCC inputted from a standby unit is applied to a gate terminal and a drain terminal of the first switching device Q1. The first switching device Q1 is turned on and outputs the bias voltage VCC when a high signal is outputted from the AC power output unit 111. The first switching device Q1 is turned off and may not output the bias voltage VCC when a low signal is outputted from the AC power output unit 111.

The first switching device Q1 is a MOS transistor, for example, a Metal oxide Semiconductor Field-Effect Transistor (MOSFET). As another example, the first switching device Q1 may be a bipolar junction transistor.

An output signal S2 of the bias voltage supply unit 113 is inputted to the discharge unit 115. The discharge unit 115 includes a second switching device Q2, which is turned on/off according to an output signal S2 of the bias voltage supply unit 113. In the second switching device Q2, voltage divider resistors R7 and R8 are connected to a gate terminal and an output S2 of the bias voltage supply unit 113 is inputted to the gate terminal; a discharge resistor RX is connected to a drain terminal and an output S3 of the standby power rectifier unit 114 is inputted to the discharge resistor RX; and a source terminal is grounded. The second switching device Q2 may be a MOS transistor, for example, a MOSFET. As another example, the second switching device Q2 may be a bipolar junction transistor.

Since the standby power rectify unit 114 includes diodes D1 and D2, it operates when a standby power has a positive or negative polarity.

When the first switching device Q1 of the bias voltage supply unit 113 is turned on, the second switching device Q2 is turned on. When the second switching device Q2 is turned on, an output S3 of the standby power rectify unit 114 is discharged to the ground terminal.

Here, each device of the standby power reduction unit 110 affects a time from the start of a standby mode to the start of an operation of the discharge resistor RX. A resistance value of the discharge resistor RX determines a time from the start of an operation of the second switching device Q2 to the start of a voltage drop below a predetermined value. Accordingly, a resistance value of the discharge resistor RX is reduced to make a discharge time of a standby power faster.

Figure 4:
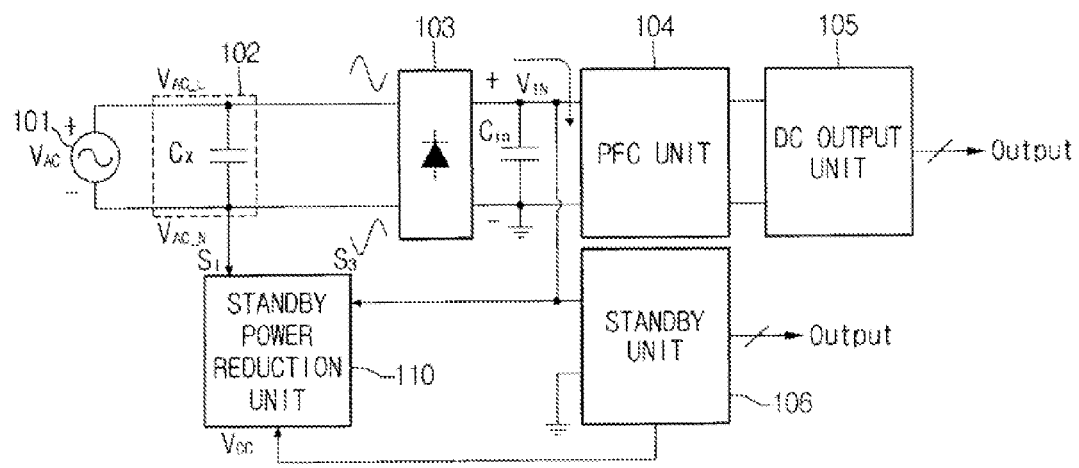
FIG. 4 is a circuit diagram of a power supply device according to a second embodiment.
Figure 5:
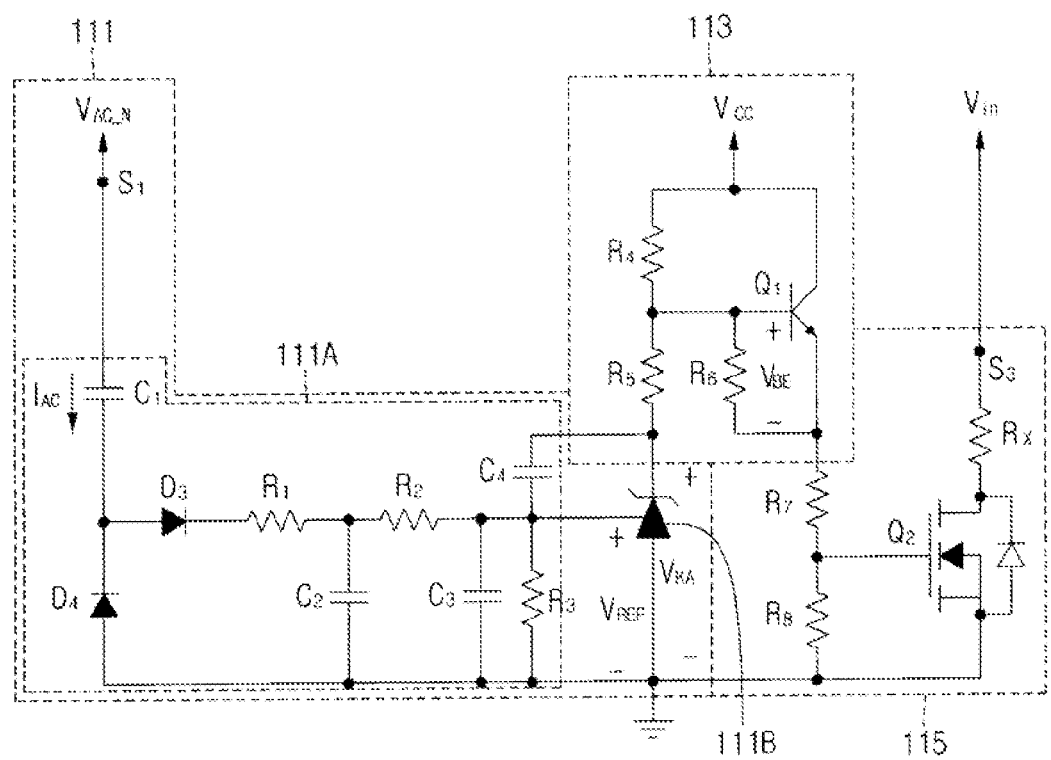
FIG. 5 is a circuit diagram of the standby power reduction unit of FIG. 4.

FIGS. 4 and 5 are detailed configuration of a power supply device and a standby power reduction unit according to a second embodiment.

Referring to FIG. 4, the standby power reduction unit 110 receives a standby power through an output terminal of the rectifier unit 103, i.e., a positive polarity terminal, and then discharges it. Without the additional standby power rectifier unit of FIG. 2, the rectified power Vin of the rectifier unit 103 is discharged.

The standby power reduction 110 operates in a standby mode and the standby power stored in the AC power output unit is applied to the standby power reduction unit 110 through the rectifier unit 103 and then is discharged. Additionally, the power stored in the input capacitor Cin connected to the output terminal of the rectifier unit 103 may be applied to the standby power reduction unit 110 and then may be discharged.

The standby power reduction unit 110 may discharge a voltage of the capacitor Cx of the AC power output unit 102 and a voltage of the input capacitor Cin connected to the output terminal of the rectifier unit 103 to be less than a predetermined level and may provide a discharge path in a standby mode.

FIG. 5 is a circuit diagram of the standby power reduction unit of FIG. 4. Like FIGS. 4 and 5, since a standby power is discharged through a path of the rectifier unit 103, the first and second diodes of the standby power rectifier unit shown in FIG. 3 may not be required.

Figure 6:
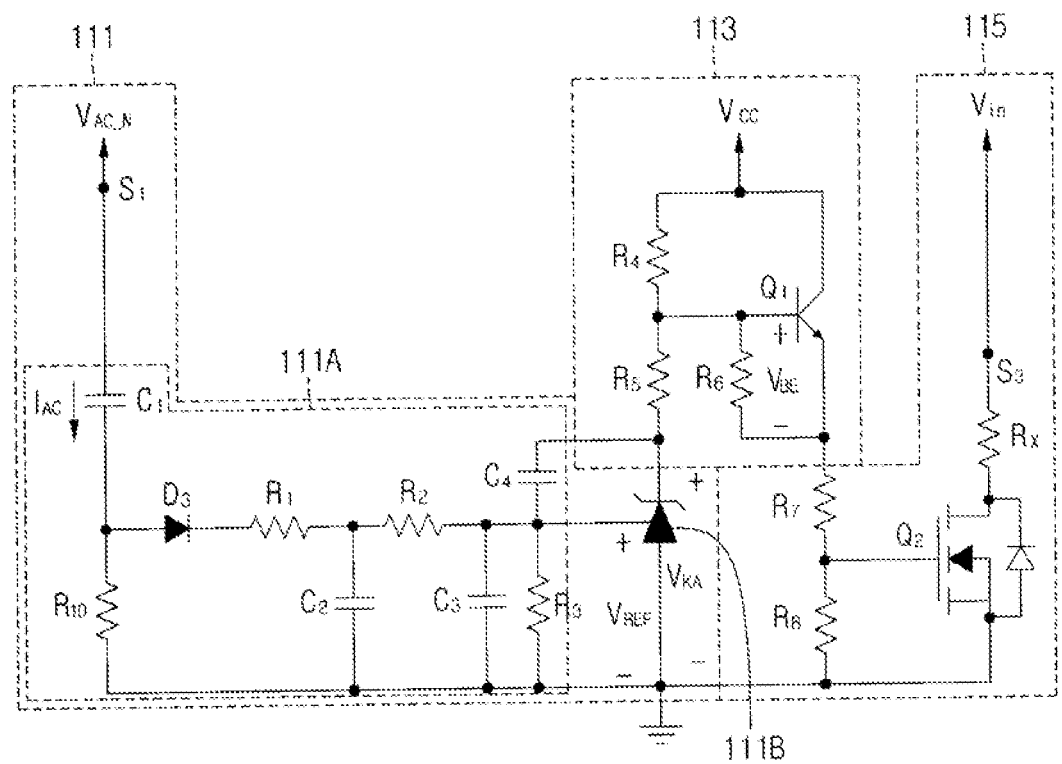
FIG. 6 is a circuit diagram of a standby power reduction unit according to a third embodiment.

FIG. 6 is a circuit diagram of a standby power reduction unit according to a third embodiment.

Referring to FIG. 6, the standby power reduction unit connects the resistor R10 instead of the diode D4 of FIG. 3 to a reverse current path connected to the first capacitor C1, thereby allowing a reverse current of the first capacitor C1 to flow through resistance.

Figure 7:
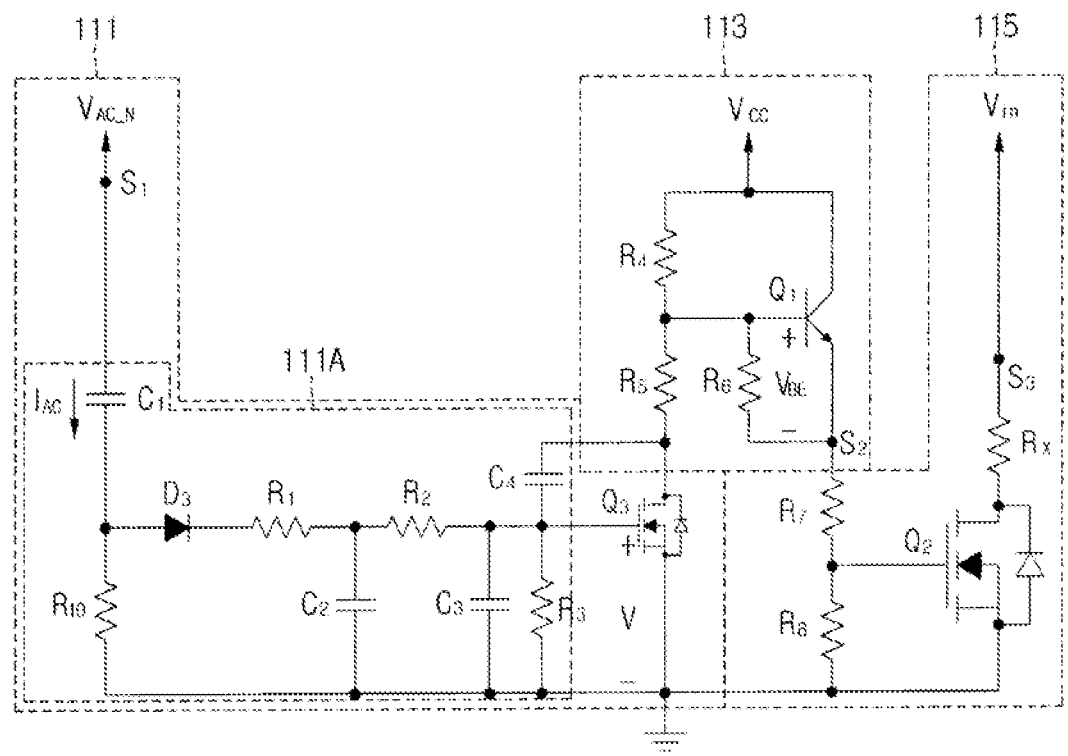
FIG. 7 is a circuit diagram of a standby power reduction unit according to a fourth embodiment.

FIG. 7 is a circuit diagram of a standby power reduction unit according to a fourth embodiment.

Referring to FIG. 7, the AC power detection unit 111 of the standby power reduction unit includes an operating voltage detection circuit 11A and a switching device Q3. The third switching device Q3 may be a MOSFET and, as another example, may be a bipolar junction transistor.

When the third switching device Q3 is in a standby mode, a low signal is applied to a gate terminal and a bias voltage Vcc is applied to a base terminal of the first switching device Q1, so that the third switching device Q3 operates. Accordingly, the first switching device Q1 operates through conduction. Due to an operation of the first switching device Q1, the second switching device Q2 is conducted, thereby discharging a standby power to a ground terminal through the discharge resistor Rx connected to a drain terminal.

Figure 8:
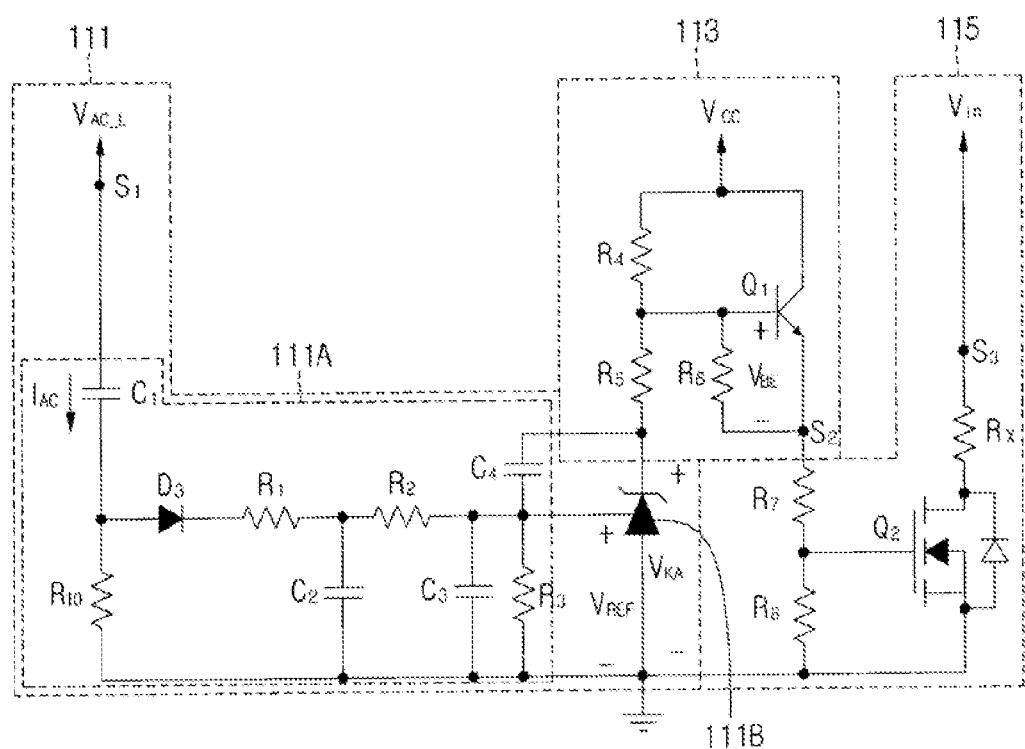
FIG. 8 is a circuit: diagram of a standby power reduction unit according to a fifth embodiment.

FIG. 8 is a circuit diagram of a standby power reduction unit according to a fifth embodiment.

Referring to FIG. 8, the AC power detection unit 111 of the standby power reduction unit is connected to the AC power $V_{AC\_L}$ of a positive polarity. That is, the AC power detection unit 111 may be selectively connected to a positive polarity or a negative polarity of the power unit but is not limited thereto.

The standby power reduction unit according to embodiments may be applied to image devices such as a plasma display panel (PDP) TV, a liquid crystal display (LCD) TV, a light emitting diode (LED) TV, and a monitor and also various lighting devices.

According to embodiments, a relay may not be required.

According to embodiments, a relay having a large size is not required, so that electronic products such as TVs or monitors may have a thin thickness.

According to embodiments, a reliable standby power reduction device may be provided.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A power supply device comprising:
   an AC power output unit storing and outputting an AC power;
   a rectifier unit rectifying an output of the AC power output unit;
   a DC output unit outputting an output from the rectifier unit as a DC power; and
   a standby power reduction unit detecting a signal regarding whether the AC power is inputted or not and discharging a standby power stored in the AC power output unit in response to the detected signal,
   wherein the standby power reduction unit comprises:
   an AC power detection unit connected to at least one of both terminals of the AC power output unit to detect an AC power inputted to the AC power output unit;
   a bias voltage supply unit outputting a bias voltage in response to a signal detected by the AC power detection unit; and
   a discharge unit connected to an output terminal of the rectifier unit and discharging a standby power stored in the AC power output unit through voltage, and
   wherein the discharge unit discharges the standby power of the AC power output unit rectified by the rectifier unit.

2. The power supply device according to claim 1, wherein the standby power reduction unit comprises a standby power rectifier unit connected to the both terminals of the AC power output unit to rectify a standby power of positive polarity and negative polarity stored in the AC power output unit and output the rectified standby power to the discharge unit.

3. The power supply device according to claim 1, wherein the discharge unit of the standby power reduction unit is connected to an output terminal of the rectifier unit.

4. The power supply device according to claim 3, further comprising an input capacitor connected in parallel to the both terminals of the rectifier unit, wherein the discharge unit receives an AC power of the AC power output unit and a power stored in the capacitor.

5. The power supply device according to claim 1, further comprising a Power Factor Correction (PFC) unit disposed between the rectifier unit and the DC output unit.

6. The power supply device according to claim 1, wherein the bias voltage supply unit receives an output voltage of the rectifier unit or a standby voltage.

7. The power supply device according to claim 1, wherein the AC power detection unit comprises:
   an operating voltage detection circuit detecting an operating voltage of the AC power; and
   a shunt regulator controlling an operation of the bias voltage supply unit by comparing an operating voltage of the operating voltage detection unit with a reference voltage.

8. The power supply device according to claim 1, wherein the AC power detection unit comprises:
   an operating voltage detection circuit detecting an operating voltage of the AC power; and
   a switching device controlling an operation of the bias voltage supply unit through switching by an operating voltage of the operating voltage detection unit.

9. The power supply device according to claim 1, wherein the bias voltage supply unit comprises a first switching device controlling an output of the bias voltage according to an output level of the AC power detection unit; and
   the discharge unit comprises a second switching device controlling a switching output of a standby power of the AC power output unit according to an output of the first switching device.

10. The power supply device according to claim 1, wherein the AC power detection unit comprises an operating voltage detection circuit and a comparison device;
    the operating voltage detection circuit comprises first to third resistors, the first and second resistors constituting a voltage divider circuit, the third resistor being connected in parallel to the second resistor; and
    a reference terminal Vref of a comparison device is connected to a connection node between the second resistor and the third resistor.

11. The power supply device according to claim 10, further comprising second and third capacitors having one terminals connected respectively to the both terminals of the second resistor and the other terminals grounded.

12. The power supply device according to claim 10, further comprising a third diode having a cathode connected to the first resistor.

* * * * *